April 13, 1937.  G. A. ROBISON  2,076,918
HOSE COUPLING
Filed March 20, 1936

Inventor
GEORGE A. ROBISON
By Irving A. M<sup>c</sup>Cathran
Attorney

Patented Apr. 13, 1937

2,076,918

UNITED STATES PATENT OFFICE 2,076,918

HOSE COUPLING

George A. Robison, Bakersfield, Calif.

Application March 20, 1936, Serial No. 69,929

1 Claim. (Cl. 285—178)

This invention relates to hose or pipe couplings, and has for one of its objects the production of a simple and efficient means for facilitating the connection of two sections of a hose or pipe together, and at the same time provide an efficient means for firmly locking and holding the sections tightly together after having been assembled.

A further object of this invention is the production of a hose or pipe coupling wherein the securing pins carried by one member of the coupling will be held in wedging engagement with the side walls of receiving slots of an adjoining member for firmly locking the sections of the coupling together.

Other objects and advantages of the present invention will appear throughout the following specification and claim.

In the drawing:—

Figure 4 is a transverse section taken on line 4—4 of Figure 1, certain other parts also being shown in section;

Figure 7 is an enlarged side elevation of a portion of the coupling joint, illustrating the pin receiving bayonet slot and angularly extending clamping slot.

Figure 1:
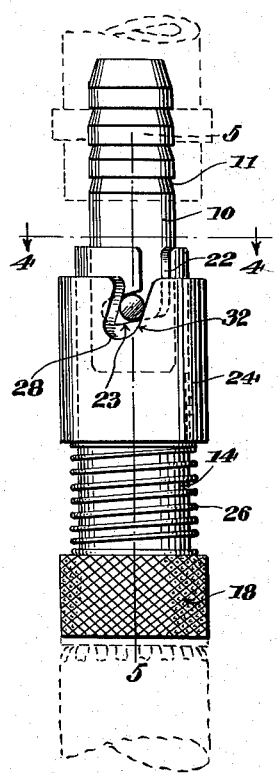
Figure 1 is a side elevation of the coupling in an assembled position.

By referring to the drawing, it will be seen that 10 designates the male section of the coupling which comprises a hollow tube having channels 11 formed near the outer end to facilitate the connection of one end of the length of a piece of hose thereto. The male section 10 is provided with a pair of oppositely arranged laterally extending securing pins or circular lugs 12, which may be secured to the section 10 in any desired manner. The inner end of the section 10 is also beveled, as at 13.

The coupling also comprises a female section 14 having a central bore 15, which is adapted to constitute a continuation of the bore 16 in the male section 10, when the sections are assembled. The female section is provided with a beveled shoulder 17 against which the beveled end 13 of the male section 10 is adapted to firmly fit. The female section 14 is provided at its inner end with an enlarged collar 18, in which is formed a threaded socket 19. A shoulder 20 is formed at the inner extremity of the socket against which shoulder 20 fits a sealing resilient washer 21, whereby a conventional threaded connection of a hose section may be fitted and secured therein.

The outer end of the section 14 is provided with a pair of oppositely arranged bayonet slots 22. The bayonet slots 22 are provided with oppositely extending circumferentially extending portions 23 which are slightly inclined away from the inner end of the section 14, as shown in the enlarged detail Figure 7.

A locking sleeve 24 is slidably mounted upon the female section 14 and a coil spring 26 is carried by the section 14 having one end abutting the shoulder 20 of the section 14 and the opposite end engaging the inner end 27 of the locking sleeve 24. The coil spring 26 yieldably urges the locking sleeve 24 outwardly toward the outer end of the section 14.

Figure 2:
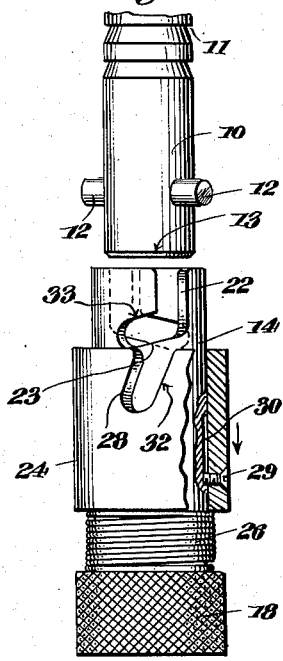
Figure 2 is a side elevation of the coupling with the sections separated, certain parts being shown in section.
Figure 6:
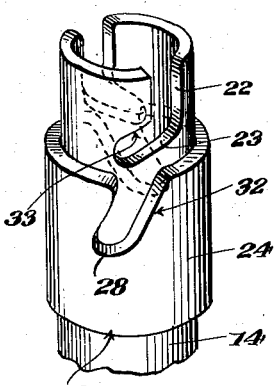
Figure 6 is a perspective view of a portion of the female section of the coupling, showing the socket end and clamping sleeve.

The locking sleeve 24 is provided with a pair of inwardly extending inclined wedging notches 28 formed therein and extending inwardly from the outer end of the sleeve 24, as shown in Figures 6 and 7. The notches 28 are inclined slightly in the direction of the closed ends of the portions 23 of the slots over which the notches 28 are adapted to overlap when the sleeve 24 is in an extended or locking position. A key screw 29 is carried by the sleeve 24 and works in the slot 30 formed in the female member 14, as shown in Figure 2. This screw 29 will prevent the sleeve 24 from rotating and will hold the sleeve in a proper position whereby the bayonet slots 22 and the notches 28 will register when the sleeve 24 is in an extended or locking position.

Figure 3:
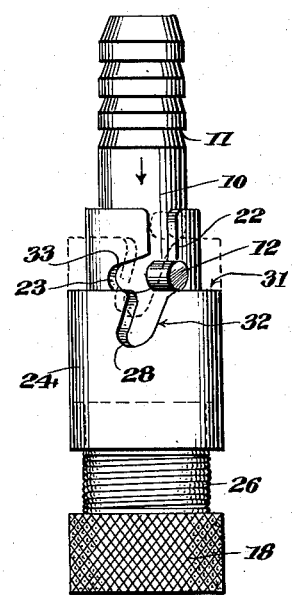
Figure 3 is a side elevation of the coupling showing the parts in the position just prior to locking the pins in engagement with the locking sleeve.
Figure 5:
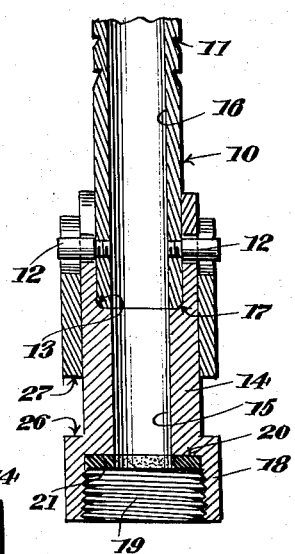
Figure 5 is a longitudinal section taken on line 5—5 of Figure 1.

When assembling the sections of the coupling, the inner end of the male section 10 is placed in the outer end of the female coupling 14, the pins 12 fitting into the bayonet slots 22, as shown in Figure 3. As the pins 12 are forced inwardly against the outer edge 31 of the sleeve 24 the spring 26 will be compressed, and the pins 12 will slip into the inclined notches 28. The walls 32 of the notches 28 will edge the circular pins 12 against the walls 33 of the portions 23 of the bayonet slots 22, thereby firmly locking the sections together and at the same time forcing the beveled end 13 upon the shoulder 17.

From the foregoing description, it will be seen that a very simple coupling has been produced whereby the sections may be easily assembled, as well as easily separated. Due to the fact that the sleeve 24 is spring pressed, it should be understood that as the circular pins 12 are forced against the outer end 31 of the sleeve 24, the pins 12 will automatically slip into the inclined notches 28 and will be forced by the walls 32 into the portions 23 against the walls 33. This automatic action is made possible due to the fact that the open ends of the notches 28 are in partial alignment with the longitudinally extending portions of the bayonet slots 22.

It should be understood that the present coupling construction is adaptable for hose, pipe and other forms of connection of a similar nature.

Having described the invention, what I claim as new is:

A coupling of the class described comprising a pair of sections, the sections having interfitting engagement, one section having laterally extending circular lugs, the other section having oppositely extending bayonet slots formed at one end for receiving said lugs of the first mentioned section, a spring pressed sleeve slidable upon said other section, said sleeve having notches for receiving said lugs and being adapted to hold said lugs within said bayonet slots, the inner ends of the bayonet slots being inwardly inclined toward their closed ends, the notches in said sleeve being adapted to overlie the bayonet slots and receive said lugs for locking said lugs within the inner ends of said bayonet slots, said notches being inclined toward the closed ends of said bayonet slots and having their open ends partly overlying the longitudinal portions of said bayonet slots, whereby said lugs will be automatically directed into the inner ends of said bayonet slots and wedged therein as the lugs are forced against the outer end of said spring pressed sleeve.

GEORGE A. ROBISON.